(12) United States Patent
Oh et al.

(10) Patent No.: US 8,499,610 B2
(45) Date of Patent: Aug. 6, 2013

(54) TEST APPARATUS AND METHOD FOR SAFETY VALVE

(75) Inventors: Seung-jong Oh, Daejeon (KR);
Dong-wook Jerng, Seoul (KR);
Jong-woon Park, Daejeon (KR);
Kab-ju Kwon, Daejeon (KR);
Chang-hyun Kim, Daejeon (KR)

(73) Assignee: Korea Hydro & Nuclear Power Co., Ltd., Seoul (KR)

( * ) Notice: Subject to any disclaimer, the term of this patent is extended or adjusted under 35 U.S.C. 154(b) by 428 days.

(21) Appl. No.: 12/811,834

(22) PCT Filed: Jan. 6, 2009

(86) PCT No.: PCT/KR2009/000040
§ 371 (c)(1),
(2), (4) Date: Jul. 7, 2010

(87) PCT Pub. No.: WO2010/058880
PCT Pub. Date: May 27, 2010

(65) Prior Publication Data
US 2010/0281954 A1    Nov. 11, 2010

(30) Foreign Application Priority Data
Nov. 24, 2008 (KR) .............................. 2008-0116753

(51) Int. Cl.
*G01L 27/00* (2006.01)

(52) U.S. Cl.
USPC ........................................................ 73/1.72

(58) Field of Classification Search
USPC ........................................................ 73/1.72
See application file for complete search history.

(56) References Cited

U.S. PATENT DOCUMENTS

| 4,588,548 A | * | 5/1986 | Magee et al. | ................. 376/307 |
| 4,893,494 A | | 1/1990 | Hart | |
| 4,989,840 A | * | 2/1991 | Maric | ........................... 266/111 |

FOREIGN PATENT DOCUMENTS

| JP | 2001-165812 A | 6/2001 |
| KR | 2004-0059526 A | 7/2004 |
| KR | 2005-0069686 A | 7/2005 |

* cited by examiner

*Primary Examiner* — Hezron E Williams
*Assistant Examiner* — Paul West
(74) *Attorney, Agent, or Firm* — Leydig, Voit & Mayer, Ltd.

(57) ABSTRACT

An apparatus and method for testing the performance of a safety valve. The apparatus includes an accumulator including at least one electric heater for heating a predetermined amount of water in the accumulator, and storing steam produced by the electric heater, a test vessel storing the steam supplied from the accumulator, and providing steam at a test pressure to a safety valve, the steam being supplied after controlling flow rate and pressure, a condensing tank storing demineralized water to be supplied to the accumulator, and condensing and collecting the steam discharged from the safety valve, and a water-supply pump supplying the water stored in the condensing tank to the accumulator.

21 Claims, 6 Drawing Sheets

TEST APPARATUS AND METHOD FOR SAFETY VALVE

TECHNICAL FIELD

The present invention relates, in general, to an apparatus and method for testing the performance of a pressurizer safety valve installed on a reactor coolant system of a nuclear power plant, and more particularly, to an apparatus and method for testing the performance of a safety valve, which can perform a set pressure test, a seat tightness test, a flow rate test, a blow-down test, a water discharge test of a loop seal, a discharge load test, etc. on a pressurizer safety valve.

BACKGROUND ART

In general, a safety valve is a pressure relief device that is operated automatically by positive pressure on an inlet port side and is characterized by instantaneous opening. Such a safety valve typically has a built-in spring, and is opened or closed by force acting on this spring. This safety valve is used to prevent overpressure or to keep pressure constant in an apparatus that handles fluid.

Particularly, a pressurizer safety valve used for a reactor coolant system of a nuclear power plant is a very important component for preventing overpressure of the reactor facility. Thus, this pressurizer safety valve is periodically tested in order to check whether it is accurately operated within a set pressure tolerance.

The test of the pressurizer safety valve is specified in in-service inspection code and standards such as American Society for Mechanical Engineering (ASME) OM App. I, ASME PTC 25, Korea Electric Power Industry Code (KEPIC) MOD, KEPIC MBK, and so on.

Based on these code and standards, the pressurizer safety valve undergoes a set pressure test once every five (5) years. At least 20% of all safety valves are subjected to the set pressure test every two (2) years. When a part of the safety valve is replaced, the replaced safety valve undergoes the set pressure test before production of electric power is resumed.

The test methods complying with these code and standards include an in-situ test using an auxiliary lift device with the safety valve installed on the facility, a bench test using a bench set on which the safety valve is mounted, and a test facility test using an off-site test facility.

The in-situ test is a method that measures the set pressure with the safety valve installed on the facility. Particularly, if the safety valve is installed on the facility, for instance, by welding, only the in-situ test can be used.

The auxiliary lift device is a device that applies an auxiliary lifting force to system pressure in order to open the safety valve. For the purpose of the set pressure test, the auxiliary lift device is mounted on the safety valve. After keeping thermal equilibrium for 30 minutes or more, the pressure of an air motor of the auxiliary lift device is gradually increased to the set pressure of the safety valve so as to pop open the safety valve.

The set pressure test of the pressurizer safety valve using the auxiliary lift device is generally performed using the auxiliary lift device prior to a cool down operation after the reactor is stopped in order to minimize an influence on the power plant operation during testing and to determine whether or not the pressurizer safety valve requires maintenance during overhaul of the power plant. When this test is performed, there is a possibility of causing a transient phenomenon in which the pressure of a reactor coolant system is reduced during operation, and a fluid containing radioactive materials is discharged through the safety valve.

When the safety valve is equipped with a loop seal, if the set pressure test is performed in the state in which loop seal water is drained, it is impossible to measure an influence of the operation of the safety valve associated with discharge of water from the loop seal. In contrast, when the set pressure test is performed in the state in which loop seal water is not drained, parts of the safety valve may be damaged or loosened by vibration due to instantaneous discharge of water from the loop seal when the safety valve is operated.

The bench test is a method of testing the safety valve attached to the bench set having a flange at room temperature. This bench set is equipped with a pressure supply apparatus of a fluid such as nitrogen, air or water, a pressure controller, a flange coupled with the subject safety valve, a pressure gauge connected to the flange, and so on. If necessary, the bench set may include a complicated device having several flanges coupled with, for instance, a chart recorder for recording set values in order to perform various functions and an automatic test.

The type of this bench set is determined according to the number and kind of safety valves to be tested, code requirements, and available space. Examples of the bench set are well disclosed in Korean Patents Nos. 10-0540308 (titled Apparatus for Testing Seat Tightness and Pressure Setting of Pressurizer Safety Valves granted on Dec. 26, 2005) and 10-0311775 (titled Safety Valve Testing Apparatus granted on Sep. 28, 2001), and U.S. Pat. No. 4,893,494 (titled Method and System for Testing Safety Relief Valves granted on Jan. 16, 1990).

The apparatus for testing seat tightness and pressure setting of pressurizer safety valves disclosed in Korean Patent No. 10-0540308 is designed to directly carry out a seat tightness test and a pressure setting test on the pressurizer safety valve at room temperature. The apparatus for testing seat tightness and pressure setting of pressurizer safety valves, each of which has a seat tightness checking flange, includes: a nitrogen gas storage storing nitrogen gas; a pump connected to the nitrogen gas storage, pressurizing and pumping the nitrogen gas, pressure of which is increased to seat tightness test or pressure setting test values of the safety valve, and discharging the pumped nitrogen gas to a pressure storage tank; the pressure storage tank storing the nitrogen gas discharged from the pump; a pressure regulating valve connected to the pressure storage tank, regulating pressure of the nitrogen gas discharged from the pressure storage tank, and discharging the regulated nitrogen gas to an injection pipe installed on the side of a seat tightness and pressure setting test bench through a high-pressure hose; and the seat tightness and pressure setting test bench injecting the nitrogen gas injected from the pressure regulating valve into a lower portion of the pressurizer safety valve seated on an upper surface thereof to be able to measure an amount of the nitrogen gas for the seat tightness test and an amount of the nitrogen gas for the pressure setting test in the pressurizer safety valve.

The safety valve testing apparatus disclosed in Korean Patent No. 10-0311775 is designed to test abnormality of a safety valve using forcibly provided pressure. The safety valve testing apparatus includes a high-pressure cleaner supplying pressurized water; a tester including a pressure tank installed in an upright posture, an upper space of which enters a high-pressure state so as to buffer a change in pressure when receiving the pressurized water from the high-pressure cleaner at a lower portion thereof, a main valve preventing the pressurized water from simultaneously flowing to both a test connector connected with a subject safety valve and a recorder recording a test pressure state until set pressure is maintained in the pressure tank, and a flange connected with the subject safety valve through the test connector; and the recorder converting a change in output pressure of the main valve of the tester into an electrical signal, and recording the converted electrical signal. The pressure tank, to which the pressure is provided through the high-pressure cleaner, is additionally provided with an accumulator at a front end thereof which outputs pressure under overpressure. The flange is installed on a support plate. The support plate is configured such that a size thereof can be selected according to a size of the subject safety valve.

The method and system for testing safety relief valves disclosed in U.S. Pat. No. 4,893,494 utilizes a pressure vessel coupled with and being in communication with the subject safety relief valve and a high pressure fluid reservoir supplying the fluid to the pressure vessel. The method and system permit the subject safety relief valve with air as well as water. The system includes: a first pressure vessel; a second pressure vessel; means for releasably securing a safety relief valve and in fluid communication with the second pressure vessel; first means for controlling high pressure fluid flow into the first pressure vessel; a first fluid passageway connecting and disposed between the first and second pressure vessels; a second fluid passageway connecting and disposed between the releasable securing means and the second pressure vessel; and second means for controlling fluid flow between the first and second pressure vessels.

The bench test using the bench set is used for the set pressure test and seat tightness test for the safety valve at room temperature, but has conditions different from high-temperature thermal equilibrium conditions on which the safety valve is actually installed and operated on the facility. Thus, there is a problem in that, in the event of overpressure of the facility or system (e.g. reactor coolant system), an actual opening pressure of the safety valve is not matched with the set pressure of the safety valve based on the bench test.

The test facility test using the off-site test facility is performed in the state in which the subject safety valve is mounted on the test facility and under the same conditions of fluid, temperature, pressure and thermal equilibrium as the facility in which the safety valve is used. Thus, the test facility test using the off-site test facility is the most accurate test method among the aforementioned test methods. The apparatus for testing the performance of a pressurizer safety valve according to the present invention belongs to the off-site test facility, and can carry out the test under the same conditions on which the pressurizer safety valve is installed and operated.

FIG. 1 schematically illustrates a conventional apparatus for testing the performance of a safety valve.

The testing apparatus has a test vessel 1 supplied with steam pressure from a boiler 2 as a pressure supply. The boiler 2 must be equipped with accessories such as a water-supply facility 3 and a fuel injector. Since energy may be released during testing due to damage to a subject safety valve 4, the test vessel 1 is installed between the subject safety valve 4 and the boiler 2, and the boiler 2 is equipped with a pressure supply valve 7 and a bypass valve 8 of the pressure supply valve 7 to enable pressurization of the subject safety valve 4 up to pressure of the boiler 2 or to block the release of the energy when the subject safety valve 4 is damaged during testing. A shut-off valve 5 for the subject safety valve 4 is installed between the subject safety valve 4 and the test vessel 1 to shut off the steam in the event of the damage or leakage of the safety valve. This shut-off valve 5 has a sufficient volume that a flow of test fluid injected into the subject safety valve 4 from the test vessel is not restricted. A pipe connecting the two valves 5 and 6 has a sufficient size such that unnecessary pressure drop does not take place between the subject safety valve 4 and the test vessel 1. The test facility performing all flow tests on the safety valve is designed so that all of the valves, adaptors, flanges, and test nozzles withstand a discharge force of the subject safety valve 4 as well as the discharge force transmitted to the test vessel. All pressure sensing pipes are connected spaced apart from inlet and outlet nozzles 12 and 13 of the test vessel 1 in order to avoid an error in pressure measurement which is responsible for a flow rate during testing. In the case of the test using steam, the test facility is equipped with a steam trap 10 and a drain valve 11 so as to be kept warm by a heat insulator and to produce saturated steam of at least 98%.

In the conventional off-site test facility as illustrated in FIG. 1, the flow rate passing through the subject safety valve 4 and the overpressure applied to the subject safety valve 4 are involved in capacity of the boiler 2, i.e. the pressure supply, to generate flow. Thus, in order to test the safety valve having high set pressure and flow rate, a high-capacity boiler and accessories compatible with the boiler are required. As such, the establishment of the safety valve test facility requires relatively high cost and wide space. Further, when a discharge port of the subject safety valve is exposed to the air, excessive noise (e.g. of 130 dB or more) is generated. Thus, it is difficult to install the test facility near a residential area.

Technical Problem

Accordingly, the present invention has been made in an effort to solve the problems occurring in the related art, and an exemplary embodiment of the present invention provides an apparatus and method for testing the performance of a safety valve, which can perform tests under the same operation conditions as a pressurizer safety valve installed on a reactor coolant system of a nuclear power plant so as to perform the tests with precision.

Another exemplary embodiment of the present invention provides an apparatus and method for testing the performance of a safety valve, which can relatively easily produce and use high-temperature, high-pressure steam required for testing the safety valve because a complicated boiler facility is not required.

Still another exemplary embodiment of the present invention provides an apparatus and method for testing the performance of a safety valve, which can optimize constituent components on the respective quadrants as a closed loop so as to have a compact configuration, thereby effectively reducing an installation space and materials required for manufacturing.

Yet another exemplary embodiment of the present invention provides an apparatus and method for testing the performance of a safety valve, which can properly absorb energy generated from the safety valve to reduce noise and simultaneously to effectively condense and collect an expensive purified fluid.

Technical Solution

According to one aspect of the present invention, there is provided an apparatus for testing the performance of a safety valve to perform a set pressure test, a seat tightness test, a flow rate test, a blow-down test, a discharge test of a loop seal, a discharge load test, etc. on the safety valve. The apparatus includes: an accumulator 21 including at least one electric heater 22 for heating a predetermined amount of water filled therein, and storing steam produced by the electric heater 22 under high pressure; a test vessel 41 storing the steam supplied from the accumulator 21 under high pressure, and providing test pressure to a subject safety valve 48, the steam being supplied after flow rate and pressure thereof are controlled; a condensing tank 81 storing demineralized water to be supplied to the accumulator 21, and condensing and collecting the high energy steam discharged from the subject safety valve 48; and a water-supply pump 111 supplying the water stored in the condensing tank 81 to the accumulator 21.

According to another aspect of the present invention, there is provided a method for testing the performance of a safety valve to perform a set pressure test, a seat tightness test, a flow rate test, a blow-down test, a water discharge test of a loop seal, a discharge load test, etc. on the safety valve. The method includes: 1) filling a condensing tank 81 with a predetermined amount of water, the condensing tank 81 storing demineralized water to be supplied to an accumulator 21 and condensing and collecting steam discharged from the subject safety valve 48; 2) filling the accumulator 21 with the water of the condensing tank 81 to a predetermined water level using a water-supply pump 111; 3) heating the water filled in the accumulator 21 using at least one electric heater 22 to produce the steam; 4) supplying the steam produced from the accumulator 21 to a test vessel 41 under a control of flow rate and pressure, and pressurizing the accumulator 21 and the test vessel 41 to a preset pressure; and 5) continuously operating the electric heater 22 of the accumulator 21 to increase the pressure to operating pressure of the subject safety valve 48, and testing the subject safety valve 48.

Advantageous Effects

The testing apparatus performs tests under the same operation conditions (fluid, pressure and temperature) as a pressurizer safety valve installed on a reactor facility, so that it can perform the tests more precisely than an in-situ test using an auxiliary lift device and a bench test using a bench set on which the safety valve is mounted, both of which test under operation conditions different from those of the safety valve.

The testing apparatus includes an accumulator of an optimum volume having an electric heater of an optimum capacity and a test vessel of an optimum volume, which are required for testing the safety valve, so that it can relatively easily produce and use high-temperature, high-pressure steam required for testing the safety valve because a complicated boiler facility is not required.

The testing apparatus optimizes the size and capacity of main components, such as a water-supply treatment system, a water-supply pump, an accumulator, a test vessel and a condensing tank, on the respective quadrants as a closed loop so as to have a compact configuration, so that it can effectively reduce an installation space and materials required for manufacturing. Since the various components of the testing apparatus are located adjacent to each other when the testing apparatus is operated, it is very easy to observe the situations of the components or to monitor the instruments. As a result, this configuration is very effective for safe operation and optimum performance maintenance of the testing apparatus.

The testing apparatus is configured to sparge a large quantity of steam discharged when the subject safety valve is opened through a sparger submerged in the water of the condensing tank, and thus properly absorb energy generated from the safety valve, so that it can not only effectively reduce noise but also effectively condense and collect an expensive purified fluid.

Among the components of the testing apparatus, the accumulator can relatively easily produce high-temperature, high-pressure water and steam. Thus, the testing apparatus includes a blind flange capable of using the high-temperature, high-pressure water at a lower portion of the accumulator and another blind flange capable of using the high-temperature, high-pressure steam at an upper portion of the accumulator, so that it can perform various tests requiring the aforementioned high-temperature, high-pressure water and steam.

MODES OF THE INVENTION

Reference will now be made in greater detail to an exemplary embodiment of the present invention with reference to the accompanying drawings.

Figure 1:
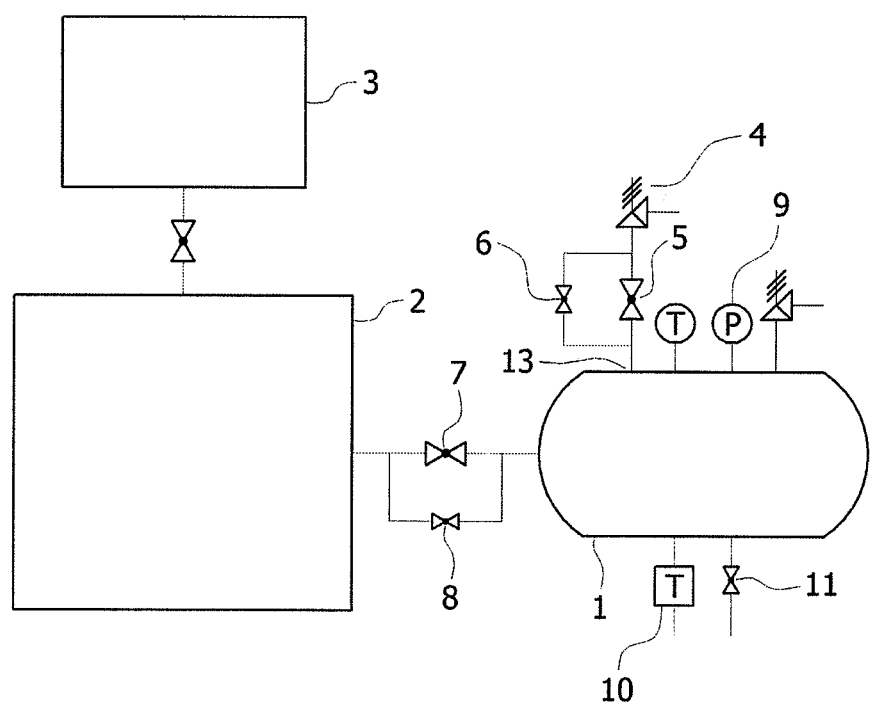
FIG. 1 schematically illustrates a conventional apparatus for testing the performance of a safety valve.
Figure 2:
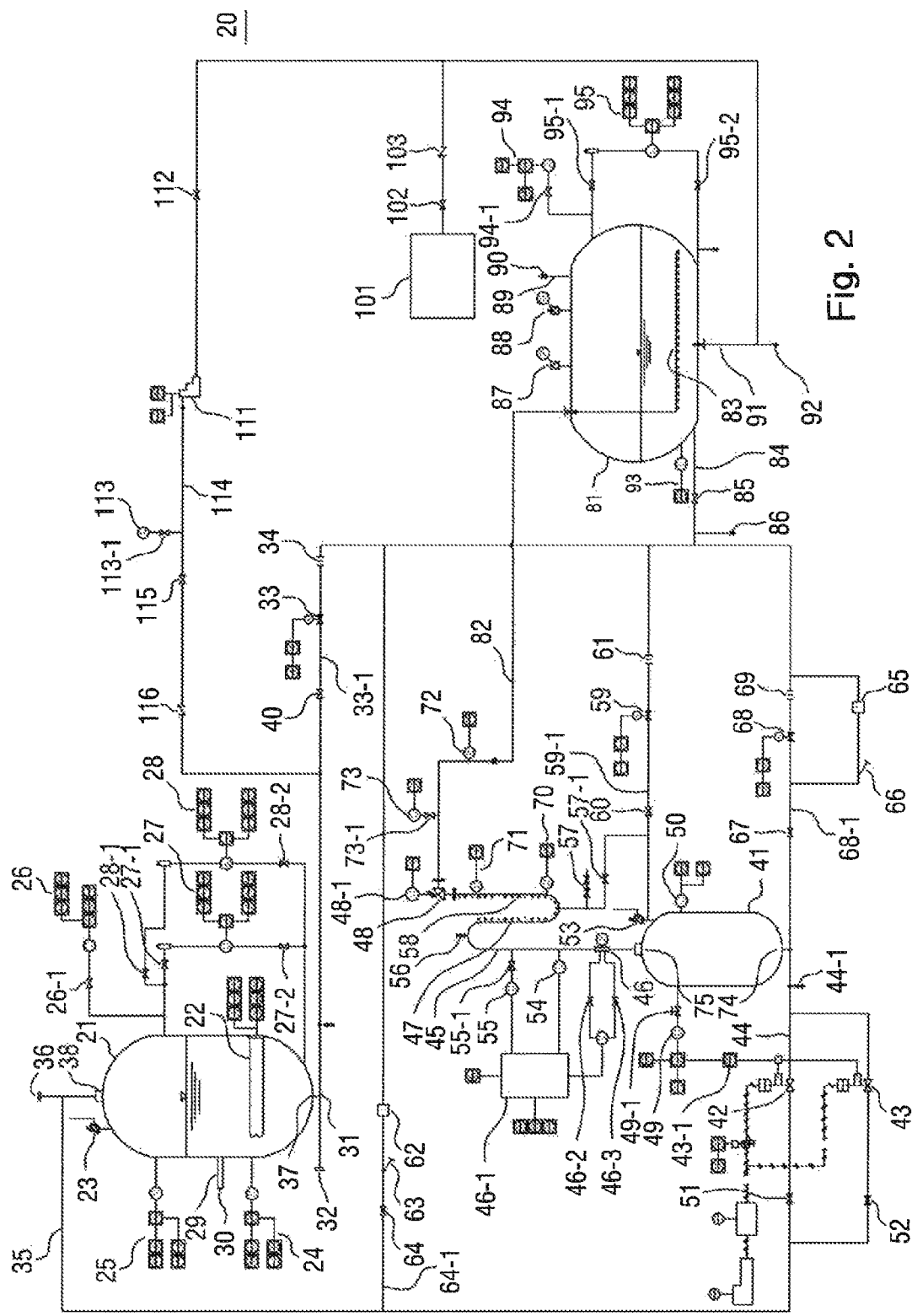
FIG. 2 is a piping and instrumentation drawing of an apparatus for testing the performance of a pressurizer safety valve according to an exemplary embodiment of the present invention.

FIG. 2 is a piping and instrumentation drawing of an apparatus for testing the performance of a pressurizer safety valve according to an exemplary embodiment of the present invention.

The testing apparatus 20 includes an accumulator 21, a test vessel 41, a condensing tank 81, a water-supply treatment system 101, a water-supply pump 111, pipes and valves, instruments, air compression systems, control and supervisory systems (not shown), and a power supply (not shown).

The accumulator 21 is a device that is filled with a predetermined amount of water, heats the water to produce steam using an electric heater, and stores high-pressure steam. The accumulator 21 is equipped with a plurality of electric heaters 22, each of which has a proper heat generation capacity (e.g. 300 kW) required to produce and pressurize the steam.

When the water in the closed accumulator 21 is heated by the electric heaters 22, it is boiled to generate steam. When the steam continues to be generated by further applying heat, the steam is accumulated at an upper portion of the accumulator, and thus undergoes an increase in pressure. A volume capacity of this accumulator 21 is determined by calculating an amount of accumulated steam required on the basis of a set pressure and a discharge flow rate of a subject safety valve 48. Capacities of the accumulator 21 and each electric heater 22 are determined by a capacity of available electric power source and an amount of steam used.

A safety valve 23 is coupled to the accumulator 21, and thus relieves overpressure to protect the accumulator 21 when pressure of the interior of the accumulator reaches a preset pressure (e.g. 220 kg/cm$^2$).

A variety of instruments are installed on the accumulator 21 for proper operation of the accumulator 21. These instruments include a temperature gauge 24 for a liquid zone, a temperature gauge 25 for a steam zone, a pressure gauge 26, a water level gauge 27 for low temperature, a water level gauge 28 for high temperature, and so on. The temperature gauge 24 and 25 are attached to a shell of the accumulator 21 in such a manner that a hole is bored into the shell of the accumulator 21 at an appropriate depth, and then a temperature sensor is inserted and welded in the hole. A sensing pipe is disposed between the pressure gauge 26 and the water level gauges 27 and 28, and is connected with a nozzle, which is inserted and welded in a through-hole bored through the shell of the accumulator 21. A shut-off valve 26-1 is installed on the pressure gauge 26 in order to isolate the sensing pipe in the event of correction or fluid leakage of the pressure gauge 26. Similarly, shut-off valves 27-1 and 27-2 and shut-off valves 28-1 and 28-2 are also installed on the water level gauge 27 for low temperature and the water level gauge 28 for high temperature respectively in order to isolate the sensing pipe in the event of correction or fluid leakage of the water level gauges 27 and 28.

Values of supervisory variables measured by these instruments are sent to the control and supervisory systems, and are used to operate the testing apparatus in a safe and efficient manner. While the testing apparatus is operated, the pressure of the accumulator 21 can be maintained within a range between atmospheric pressure and design pressure. In order to maintain a proper pressure, the accumulator 21 is provided with a warning device so as to give an alarm when the pressure thereof becomes lower or higher than a preset pressure. Further, a water level of the accumulator 21 is kept higher than that of each electric heater 22. In order to maintain a proper water level, the accumulator 21 is provided with another warning device so as to give an alarm when the water level thereof becomes lower or higher than a preset water level. In addition, in order to maintain a proper temperature, the accumulator 21 is provided with another warning device so as to give an alarm when the temperature thereof becomes lower or higher than a preset temperature.

The accumulator 21 is provided with an inspection hole 29 through which inspection of interior situations thereof is possible. This inspection hole 29 is the hole of a hollow pipe, an end 30 of which is closed by a blind flange or is blocked by a stopper or a cap welded, and communicates with the accumulator 21 in such a manner that a hole is bored in the shell of the accumulator 21, and the hollow pipe is inserted and welded in the hole of the shell of the accumulator. When the interior of the accumulator 21 is to be inspected using this inspection hole 29, the blind flange or the stopper or cap of the end 30 of the inspection hole 29 is opened or cut out. Then, an inspection instrument such as an endoscope is inserted into the inspection hole 29 to inspect soundness of nozzles, electric heaters 22, etc. in the accumulator 21. After the interior inspection of the accumulator 21 is completed, the end 30 of the inspection hole 29 is closed by the blind flange or is welded with the stopper or cap again, so that the inspection hole 29 is sealed.

The accumulator 21 is connected with a pipe 31, at a lower portion thereof, which can inject or drain the water. For the high-temperature, high-pressure water of the accumulator 21 to be used for another instrument or facility, this pipe 31 is equipped with a blind flange 32 used for connection with the other instrument or facility. Various kinds of useful tests can be carried out using the high-temperature, high-pressure water of the accumulator 21 of this testing apparatus. Such kinds of tests include an seat tightness test and a set pressure test of a water pressure relief valve, an operation test and a gland packing tightness test of a water valve, and so on.

The lower pipe 31 of the accumulator 21 is used when the water is supplied to or drained from the accumulator 21. In order to drain the water from the interior of the accumulator 21, a drain valve 33 and an orifice 34 are provided. This drain valve 33 is mainly used when the water is drained from the interior of the accumulator 21, and the orifice 34 reduces a flow rate and pressure to a proper level so as to make smooth operation. Since the orifice 34 can sufficiently lower pressure applied to a downstream side thereof, an allowable pressure level of the pipe connected between the downstream side of the orifice 34 and the condensing tank can be lowered to a proper level, and thus an installation cost can be effectively reduced. A shut-off valve 40 is installed on an upstream side of the drain valve so as to isolate the drain valve 33 when the drain valve 33 and the orifice 34 malfunction.

The accumulator 21 is connected with a steam discharge or pressurization pipe 35 at an upper portion thereof which discharges the steam of the accumulator 21 and is able to pressurize the test vessel. When high-temperature, high-pressure steam of the accumulator 21 is to be used for another instrument or facility, this pressurization pipe 35 is coupled with a blind flange 36 used for connection with the other instrument or facility. Various kinds of useful tests can be carried out using the high-temperature, high-pressure steam of the accumulator 21 of this testing apparatus. Such kinds of tests include an seat tightness test and a set pressure test of a steam safety valve, an operation test and a gland packing tightness test of a steam valve, and so on.

A structural analysis for thermal stress on the operation conditions of the accumulator is performed on joints, particularly a nozzle 37 of the accumulator 21 to which the lower pipe 31 of the accumulator 21 is connected and a nozzle 38 of the accumulator 21 to which the steam discharge pipe 35 of the accumulator 21 is connected, so as to check safety. If necessary, a thickness, shape, etc. of each nozzle and its neighboring shell of the accumulator are reinforced.

The test vessel 41 is a device that provides test pressure to the subject safety valve 48. The steam discharge pipe 35 of the upper portion of the accumulator 21 is connected with the test vessel 41 through a steam supply pipe 44 and pressure control valves 42 and 43 on a upstream side of the test vessel 41.

The first pressure control valve 42 supplying the steam of the accumulator 21 to the test vessel 41 at a proper flow rate is used when the subject safety valve 48 is tested in the state in which the test vessel 41 is pressurized at a high pressurization rate (e.g. above 100 psi/sec). This test is for performing a water discharge test of a loop seal installed on a front end of the pressurizer safety valve, and a set pressure test of the pressurizer safety valve on overpressure conditions occurring in the event of a design basis accident of a reactor facility.

The second pressure control valve 43, which has a capacity smaller than that of the first pressure control valve 42 and is installed parallel to the first pressure control valve 42, is used when the test vessel 41 is preheated, or when the pressure of the test vessel is automatically kept constant, or when the subject safety valve 48 is tested in the state in which the test vessel is pressurized at a low pressurization rate (e.g. below 2 psi/sec). This test and its procedure will be described below in detail. As for a method of automatically controlling the pressure of the test vessel 41 constant, a pressure value received from a pressure gauge 49 of the test vessel 41 is compared with that set point for a pressure controller 43-1 of the first pressure control valve 42, and then an opening of the second pressure control valve 43 is automatically adjusted.

When the first pressure control valve 42 is not used or is required to be shut off due to leakage thereof, a shut-off valve 51 is installed on an upstream side of the first pressure control valve 42. Similarly, when the second pressure control valve 43 installed parallel to the first pressure control valve 42 is not used or is required to be shut off due to leakage thereof, a shut-off valve 52 is installed on an upstream side of the second pressure control valve 43.

A pressure gauge 49 and a temperature gauge 50 are installed for proper operation of the test vessel 41. A sensing pipe to which the pressure gauge 49 is connected is connected with a nozzle, which is inserted and welded in a through-hole bored through a shell of the test vessel. The temperature gauge 50 is attached to the shell of the test vessel 41 in such a manner that a hole is bored into the shell of the test vessel 41 at an appropriate depth, and then a temperature sensor is inserted and welded in the hole. A shut-off valve 49-1 is installed on the pressure gauge 49 in order to isolate the sensing pipe in the event of correction or fluid leakage of the pressure gauge 49. Values of supervisory variables measured by these instruments are sent to the control and supervisory systems, and are used to operate the testing apparatus in a safe and efficient manner.

A safety valve 53 is installed on the test vessel 41, and thus relieves overpressure to protect the test vessel 41 when pressure of the interior of the test vessel 41 reaches a pressure set point (e.g. 220 kg/cm$^2$).

A steam discharge pipe 45 of an upper side of the test vessel 41 is connected to a Venturi tube 46 for measuring a flow rate, a loop seal 47 filled with water, and the subject safety valve 48 in that order. The subject safety valve 48 is the pressurizer safety valve, which is a main target to be tested in the testing apparatus.

The Venturi tube 46 is coupled with a flow meter 46-1, which measures a flow rate when the subject safety valve 48 is operated. This flow meter 46-1 is coupled with shut-off valves 46-2 and 46-3 in order to isolate the sensing pipe when corrected or malfunctioning.

A pipe between the Venturi tube 46 and the loop seal 47 is connected to a temperature gauge 54 for calculating density of fluid discharged from the safety valve, and a pressure gauge 55 for measuring pressure when the subject safety valve 48 is operated. This pressure gauge 55 is also coupled with a shut-off valve 55-1 in order to isolate the sensing pipe for maintenance or under malfunctioning.

The loop seal 47 is a device that is filled with water in the case in which high-temperature, high-pressure steam is not in direct contact with the safety valve, and is generally implemented as a U-shaped tube. In the case in which the loop seal 47 is not required to be filled with water, the loop seal 47 can be configured to be continuously drained, and thus be maintained in the state where it is filled with steam. The loop seal 47 is equipped with a vent valve 56 for filling water and a drain valve 57. The loop seal 47 is filled with water before the testing apparatus is pressurized.

In order accurately simulate and measure a behavior of the water discharged from the loop seal through the operation of the subject safety valve 48 like a pressurizer safety valve and loop seal of a nuclear power plant, an electrical heat tracing system 58 and a temperature gauge 70 are installed on the subject safety valve 48 and a pipe of an upstream side of the subject safety valve 48, particularly the loop seal 47. This configuration makes it possible to realize a temperature condition of an actual power plant.

In order to preheat the test vessel 41, a preheating pipe 59-1 and a preheating valve 59, both of which can discharge the steam from the test vessel 41, are installed. In the event of failure or leakage of the preheating valve 59, a shut-off valve 60 for the preheating valve is installed on an upstream side of the preheating valve 59 in order to shut off the preheating valve 59. An orifice 61 is provided on a downstream side of the preheating valve 59. The orifice 61 is functionally identical to that 34 of the downstream side of the drain valve 33 of the accumulator 21.

As for a method of preheating the test vessel 41, first, the steam of the accumulator 21 is supplied to and pressurized in the test vessel 41 through the pressure control valves 42 and 43. Then, the preheating valve 59 is opened to discharge steam from the test vessel 41, and thereby high-temperature steam of the accumulator 21 is supplied to the lower portion of the test vessel 41, and then is discharged to the upper portion of the test vessel 41. Thereby, the test vessel 41 is preheated. At this time, in order to minimize thermal stress of the test vessel 41 and its associated instruments, they must be preheated at a predetermined preheating rate.

In the process of pressurizing and preheating the test vessel 41, condensate water is generated from the test vessel 41 and its connected pipes. The condensate water is drained through a steam trap 62. In order to ensure precise operation of the steam trap 62, a strainer 63 for filtering foreign materials is installed, and a shut-off valve 64 for isolating the strainer 63 and the steam trap 62 are installed for use under malfunctioning of the strainer 63 and the steam trap 62.

Further, condensate water generated inside the test vessel 41 and the steam supply pipe 44 between the first pressure control valve 42 and the test vessel 41 is discharged through a steam trap 65. In order to ensure precise operation of the steam trap 65, a strainer 66 for filtering foreign materials is installed, and a shut-off valve 67 for isolating the strainer 66 and the steam trap 65 are installed for use under malfunctioning of the strainer 66 and the steam trap 65.

When the operation of the subject safety valve 48 is tested, the condensate water must be continuously discharged from the test vessel 41 and main pipes 35 and 44. However, when the steam trap 65 discharging the condensate water from the lower portion of the test vessel 41 malfunctions, it is difficult to accurately diagnose whether or not the condensate water is discharged. For this reason, a condensate water discharge valve 68 for discharging the condensate water from the lower portion of the test vessel 41 just before testing the operation of the subject safety valve 48 is installed aside from the steam trap 65. An orifice 69 is provided on a downstream side of the condensate water discharge valve 68. The orifice 69 is functionally identical to that 34 of the downstream side of the drain valve 33 of the accumulator 21.

In order to continuously measure a disk opening of the subject safety valve 48, a spindle is provided with a linear variable differential transformer (LVDT) 48-1. In order to measure dynamic characteristics and discharge load during operation of the subject safety valve 48, a vibration gauge 71, is installed on the loop seal on the upstream side of the subject safety valve 48 and another vibration gauge 72 and a pressure gauge 73 are installed on the pipe downstream of the subject safety valve 48. A sensing pipe for the pressure gauge 73 is provided with a shut-off valve 73-1 in order to isolate the sensing pipe under correction or malfunction.

A structural analysis for thermal stress under the operating conditions of the test vessel is performed on joints, particularly a nozzle 74 of the lower portion of the test vessel 41 and a nozzle 75 of the upper portion of the test vessel 41, so as to check safety. If necessary, a thickness, shape, etc. of each nozzle and its neighboring shell of the test vessel are reinforced.

A condensing tank 81 functions to store demineralized water used in the testing apparatus of the present invention, to maintain a proper head with respect to the water-supply pump, to collect the condensate water generated during the preheating and pressurization of the test vessel, to condensate and collect the steam discharged from the subject safety valve, and to absorb noise of the subject safety valve.

A discharge pipe 82 extends from the outlet port of the subject safety valve to a sparger 83 inside the condensing tank 81, wherein the discharge pipe 82 passes through a shell of the condensing tank 81.

Figure 3:
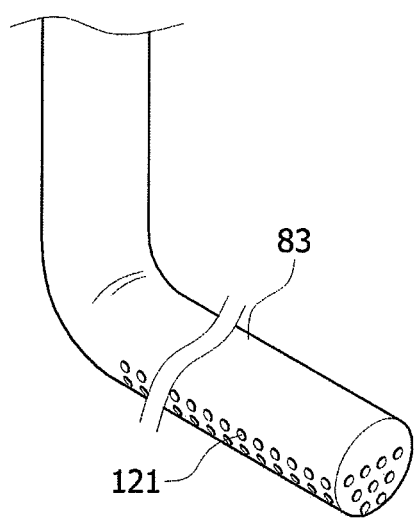
FIG. 3 is a perspective view of a sparger inside a condensing tank for steam discharged from a subject safety valve.

FIG. 3 is a perspective view of a sparger inside the condensing tank for steam discharged from a subject safety valve.

The sparger 83 is provided with a plurality of holes 121, through which the steam discharged from a subject safety valve is sparged, and is distributed at predetermined gaps with a predetermined size. When demineralized water is filled in the condensing tank 81 to a preset water level, the sparger 83 is submerged under water.

When the test is performed using the testing apparatus of the present invention, a large quantity of steam is discharged to the discharge pipe 82 all at once when the subject safety valve 48 is operated, and then the discharged steam is smoothly sparged into the condensing tank 81 through the numerous holes 121 of the sparger 83. At this time, the sparged steam is condensed while coming in contact with the water colder than the discharged steam in the condensing tank 81. The holes of the sparger 83 are preferably formed such that the steam is sparged in horizontal and downward directions other than an upward direction for the purpose of efficient sparging and condensation.

The pipe connected to the outlet port of the subject safety valve 48 is enclosed by an acoustic absorbent. Thus, if the energy of the steam discharged when the subject safety valve 48 is operated is released into the water in the condensing tank 81, the noise can be effectively reduced. With this configuration, it is possible to prevent excessive noise generated from a conventional test facility in which the subject safety valve 48 is routed to the air.

The condensing tank 81 is connected with a pipe 84, which collects condensate water generated during operation of the test apparatus of the present invention. The condensing tank 81 is equipped with a shut-off valve 85 that shuts off the condensate water collecting pipe 84 according to temperature and pressure conditions thereof, and a drain valve 86 that drains the condensate water to the outside when the shut-off valve 85 is closed.

When the subject safety valve 48 is tested using the testing apparatus of the present invention, the condensing tank 81 maintains the demineralized water to a preset level, and collects and condenses the steam and condensate water generated during preheating and pressurizing of the test vessel 41. At this time, the temperature of the condensing tank 81 is monitored through a temperature gauge 93. If the temperature of the condensing tank 81 becomes higher than a preset temperature (e.g. 95 C), a condensing effect of the condensing tank 81 is degraded. As such, the shut-off valve 85 for the condensate water collecting pipe is closed in order to stop collecting the condensate water, and then the drain valve 86 is opened.

For example, when the temperature of the condensing tank 81 is to be kept constant, a cooler or a radiator capable of cooling the demineralized water in the condensing tank 81 may be separately installed. This configuration belongs to an exemplary embodiment (not shown herein).

The condensing tank 81 is a tank into which a large quantity of high-temperature, high-pressure steam is introduced when the subject safety valve 48 is operated. For this reason, the condensing tank 81 is provided with rupture disks 87 and 88, which prevent overpressure and discharge a large quantity of fluid. Each of the rupture disks 87 and 88 is ruptured when the condensing tank 81 exceeds a predetermined pressure, thereby protecting the pressure in the condensing tank 81 from exceeding the design pressure. In particular, in order to increase reliability of the operation of the rupture disks 87 and 88, the rupture disks 87 and 88 are installed in a pair. Thus, even if one of the rupture disks malfunctions, the other enables normal function to continue. Each of the rupture disks 87 and 88 is designed to have a diameter of at least 15 inches (about 38.1 cm), thereby acting as a man hole for inspecting the interior of the condensing tank 81.

The condensing tank 81 is equipped with a vent pipe 89 and a vent valve 90, both of which can reduce the pressure of the interior of the condensing tank 81 or exhaust gas of the interior of the condensing tank 81. Further, the condensing tank 81 is equipped with a drain pipe 91 and a drain valve 92, both of which can fill the condensing tank 81 with the water or drain the water from the condensing tank 81.

The condensing tank 81 is connected with a pressure gauge 94, a temperature gauge 93 and a water level gauge 95 for smooth operation. A sensing pipe to which the pressure gauge 94 and the water level gauge 95 are connected is connected to the condensing tank 81. To this end, a through-hole is bored into the shell of the condensing tank 81, and then the sensing pipe is inserted and welded in the through-hole. The temperature gauge 93 is attached to the condensing tank 81 in such a manner that a hole is bored into the shell of the condensing tank 81, and then a temperature sensor is inserted and welded in the hole. In order to isolate the sensing pipe in the event of correction or fluid leakage of the pressure gauge 94, the pressure gauge 94 is equipped with a shut-off valve 94-1. In order to isolate the sensing pipe in the event of correction or fluid leakage of the water level gauge 95, the water level gauge 95 is equipped with upper and lower shut-off valves 95-1 and 95-2. Values of supervisory variables measured by these instruments are sent to the control and supervisory systems, and are used to operate the testing apparatus in a safe and efficient manner.

The water-supply treatment system 101 is a feeder that purifies ordinary water into demineralized water by means of a multi-stage purifier, and then supplies the demineralized water to the condensing tank 81. The water-supply treatment system 101 is connected to the drain pipe 91 at the lower portion of the condensing tank 81. The demineralized water produced from the water-supply treatment system 101 is supplied to the condensing tank 81 through a supply-water or outflow valve 102, a check valve 103, and the drain pipe 91. In this case, the vent valve 90 of the condensing tank 81 should be opened for the demineralized water to be smoothly supplied. The check valve 103 prevents the water of the condensing tank 81 from flowing back to the water-supply treatment system 101 when the water is not supplied to the condensing tank 81. The drain pipe 91 of the condensing tank 81 serves both as a pipe supplying the demineralized water from the water-supply treatment system 101 and a pipe transferring the demineralized water from the condensing tank 81 to the water-supply pump. The water-supply treatment system 101 may be replaced by an ordinary supply water system according to a cleanliness of fluid required when the subject safety valve 48 is tested using the testing apparatus of the present invention.

The water-supply pump 111 functions to supply the demineralized water of the condensing tank 81 to the accumulator 21. An amount of the supplied demineralized water is dependent on the water level of the accumulator 21. The water-supply pump 111 is configured such that its inlet port is connected with the drain pipe 91 of the condensing tank 81, and its inflow valve 112 is installed between its inlet port and the drain pipe 91. Further, the water-supply pump 111 is configured such that its outlet port is connected with the lower pipe 31 of the accumulator through its outflow pipe, and its outflow valve 115 is installed between its outlet port and the lower pipe 31. The inflow and outflow valves 112 and 115 of the water-supply pump are used when the water-supply pump 111 is required for isolation such as for maintenance. The outlet port of the water-supply pump 111 is equipped with an outlet port pressure gauge 113, and a shut-off valve 113-1 is installed on a pressure sensing pipe connected to the outlet port pressure gauge 113, and thus is used in the event of leakage or correction of the outlet port pressure gauge 113. A check valve 116 is installed on a downstream side of the outflow valve 115 of the water-supply pump, and prevents the water of the accumulator 21 from flowing back when the water-supply pump is stopped. The pipe running from the outlet port of the water-supply pump 111 to the accumulator 21 may be provided with a micro-filter according to a cleanliness of fluid required for the testing apparatus of the present invention. This pipe may be provided with a preheater for preheating the supplied water to a high temperature. In this case, the high-temperature water can be supplied to the accumulator 21, so that thermal shock can be minimized (not shown herein).

Figure 4:
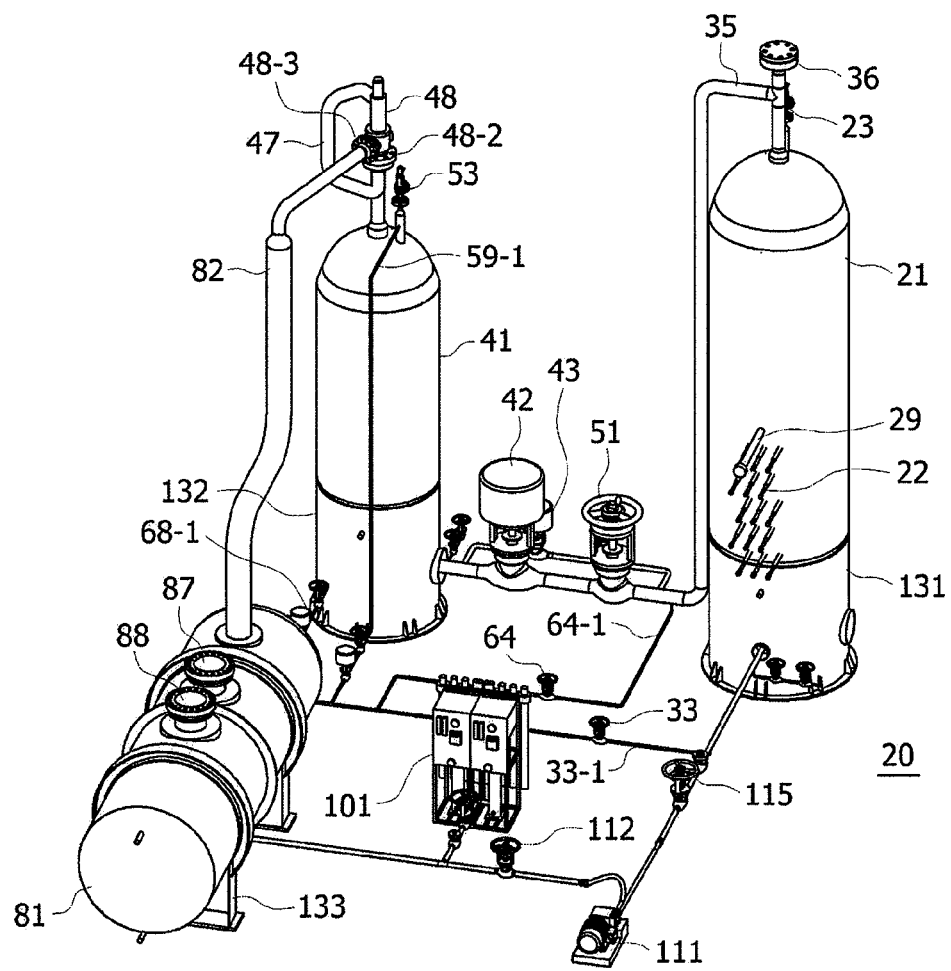
FIG. 4 is a perspective view of an apparatus for testing the performance of a pressurizer safety valve according to an exemplary embodiment of the present invention.

FIG. 4 is a perspective view of an apparatus for testing the performance of a pressurizer safety valve according to an exemplary embodiment of the present invention.

According to an exemplary embodiment of the present invention, the testing apparatus is designed such that its components are optimally arranged so as to further reduce a required space. To this end, the main components, i.e. the accumulator 21, the test vessel 41, the condensing tank 81, and the water-supply pump 111, are arranged on the respective quadrants, and are connected with each other by the pipes so as to form a closed loop. The water-supply treatment system 101 is surrounded by the four main components. Further, the drain pipe 33-1 of the accumulator 21, the preheating pipe 59-1 of the test vessel 41, and the drain pipes 64-1 and 68-1 for condensate water are arranged between the main components.

A volume of the accumulator 21 is greater than that of the test vessel 41. This is because the accumulator 21 is equipped with a liquid zone and at least one electric heater required for producing steam, and has a function of storing high-pressure steam required for testing the subject safety valve 48.

The volumes of the accumulator 21 and the test vessel 41 are designed as proper volumes capable of producing, storing, and using an amount of steam required for testing the subject safety valve 48. To this end, by using a computer code for thermal hydraulic fluid analysis, pressure behaviors and fluid flows of the accumulator 21 and the test vessel 41 can be simulated, and the volumes of the accumulator 21 and the test vessel 41, sizes of the pressure control valves, etc. can be designed on a proper scale required for testing the subject safety valve 48.

Figure 5:
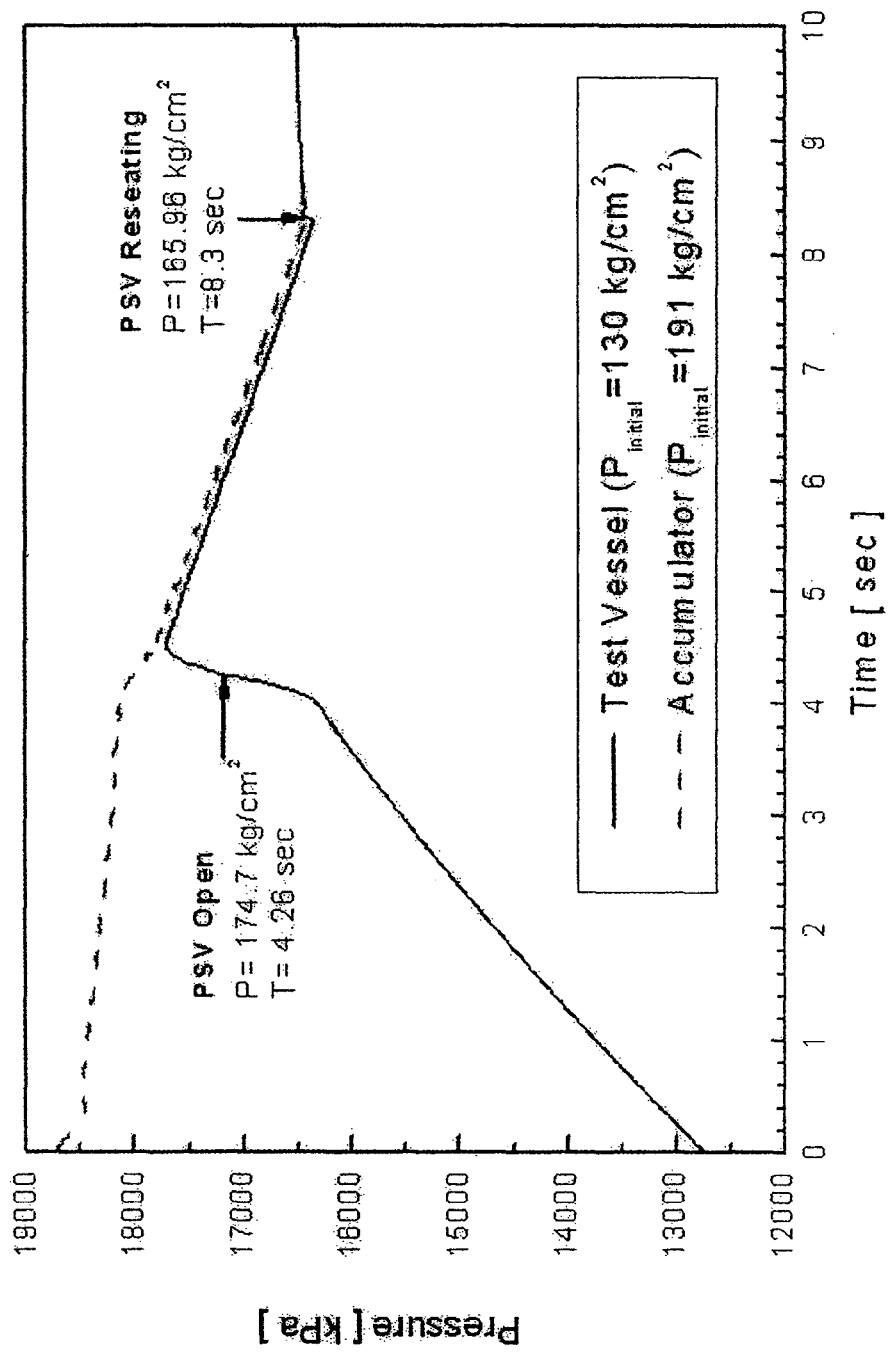
FIG. 5 is a graph showing results of simulating a change in pressures of an accumulator and a test vessel using a computer code for thermal hydraulic fluid analysis during testing of the subject safety valve.

FIG. 5 is a graph showing results of simulating a change in pressures of an accumulator and a test vessel using a computer code for thermal hydraulic fluid analysis during testing of the subject safety valve.

The test is carried out under the condition that the initial pressures of the accumulator 21 and the test vessel 41 are set to 191 kg/cm$^2$ and 130 kg/cm$^2$, respectively. In order to control the pressure of the test vessel 41, the first pressure control valve 42 is opened so as to have an opening of 2% for up to 4 seconds after the test is initiated, and then opening of 30%. In this case, a predicted change in pressures of the accumulator 21 and the test vessel 41 is shown in FIG. 5. It takes 4.26 seconds for the subject safety valve 48 to reach an opening pressure after the test is initiated. When 8.3 seconds have elapsed after the test is initiated, the subject safety valve 48 is closed. Thus, it can be found that the subject safety valve 48 remains opened for 4.04 seconds, and that a blow-down pressure can be measured when the subject safety valve 48 is closed. In order to measure an opening behavior of the subject safety valve, sufficient time to reach an opening set pressure must be given. As such, the opening of the first pressure control valve 42 is preferably set as small as possible at the beginning. After the subject safety valve 48 reaches the set pressure, a time which it takes to blow down the pressure of the test vessel must be kept as long as possible due to the steam discharged by the opening of the valve. Only in this case, is it possible to measure a flow rate of the discharged steam according to a change in pressure of the test vessel 41. In order to keep the time to blow down the pressure of the test vessel 41 for a long time, a sufficient amount of steam must be supplied from the accumulator 21. Thus, after the pressure of the test vessel 41 reaches the set pressure, the opening of the first pressure control valve 42 is preferably varied and kept to the maximum degree as soon as possible. Thus, when the pressure of the test vessel 41 is controlled in such a manner that the opening of the first pressure control valve 42 is adjusted on a desired condition according to a test purpose, the tests for opening/closing and discharge flow rate of the subject safety valve 48 are easily performed.

The accumulator 21 is preferably installed in a vertical direction rather than in a horizontal direction. The reasons are as follows: First, it is possible to provide a sufficient margin to the length for measuring the water level (i.e. the length from a lower tap to an upper tap for measuring the water level). Second, it is possible to maintain the water level to the minimum extent so as to keep the electric heater under water, and to secure the steam zone to the maximum extent. Third, it is possible to maintain a sufficient separation distance between the water surface of the accumulator 21 and the outflow pipe of the upper portion of the accumulator 21, and thus to inhibit carry-over of the moisture when the steam of the accumulator 21 is transferred to the test vessel 41.

The accumulator 21 is firmly fixed to the floor by a skirt 131. The skirt 131 supports a static load of the accumulator 21 and a dynamic load when the steam of the accumulator 21 is discharged to the test vessel 41 through the discharge pipe 35 at a maximum flow rate. A structural analysis for the static and dynamic loads is performed to check safety, thereby allowing the accumulator to have a proper shape and thickness. The test vessel 41 is also firmly fixed to the floor by a skirt 132, which supports a static load of the test vessel 41 and a dynamic load when the subject safety valve 48 is operated.

The steam discharge pipe 35 of the accumulator 21 and the discharge pipe 82 of the subject safety valve 48 are subjected to instantaneous dynamic load and thermal stress when the subject safety valve 48 is operated. As such, a structural analysis for sizes and layout of these pipes is performed to check safety, and then supports for these pipes are designed and installed at proper positions.

In order to more effectively remove the condensate water produced by the preheating and steam pressurization of the test vessel 41, and to smoothly supply the steam when the subject safety valve 48 is operated, the test vessel 41 is preferably installed in a vertical direction, and the subject safety valve 48 is preferably installed at the upper portion of the test vessel 41.

The subject safety valve 48 is preferably installed on the same pipe and position as the pipe and position on which the pressurizer or the safety valve of the reactor coolant system of the nuclear power plant is installed and operated. This is because the test can be performed by accurately applying either the pressure occurring when the facility used for the subject safety valve 48 undergoes overpressure or the pressurization rate (e.g. 375 psi/sec) to the subject safety valve 48.

Both a flange 48-2 to which the subject safety valve 48 is attached at the upper portion of the test vessel 41 and a flange 48-3 of the outflow pipe of the subject safety valve are preferably manufactured and installed in the shape of a spool piece that facilitates removal of the subject safety valve 48 having various dimensions (not shown herein).

The condensing tank 81 is firmly fixed to the floor by a band-like support 133 so as to support a dynamic load when the subject safety valve 48 is operated.

As illustrated in FIG. 4, the testing apparatus of the present invention can be configured in a compact arrangement by efficiently arranging various components within a given space. This compact arrangement reduces a size of location and space for installing the testing apparatus as well as materials used to manufacture the testing apparatus. Further, since the various components of the testing apparatus are located adjacent to each other when the testing apparatus is operated, it is very easy to observe the situations of the components or to monitor the instruments. As a result, this configuration is very effective for safe operation and optimum performance of the testing apparatus.

Figure 6:
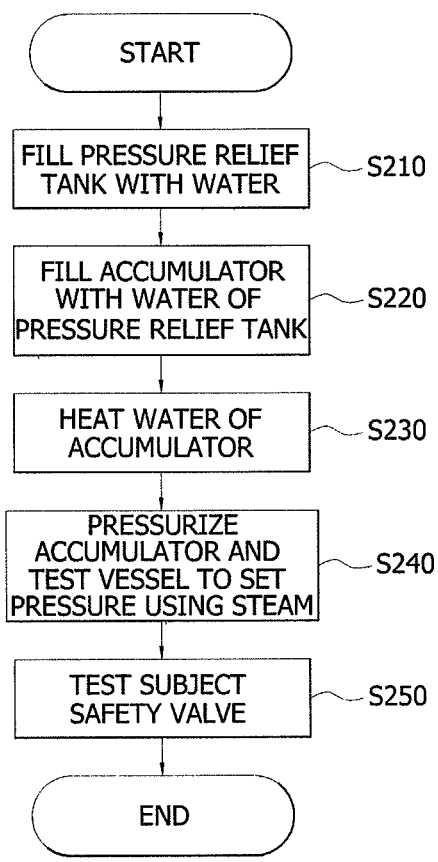
FIG. 6 is a flow chart illustrating a method for testing the performance of a safety valve according to an exemplary embodiment of the present invention.

A method of testing the subject safety valve using the testing apparatus in which the aforementioned components are combined will be described with reference to FIG. 6.

In order to test the subject safety valve 48, the testing apparatus is completely flushed, and then the subject safety valve 48 is installed. The air compression systems, electric systems, instrument system, control and supervisory systems, etc. of the testing apparatus are prepared so as to be able to operated.

In order to fill the condensing tank 81 with a predetermined amount of demineralized water (hereinafter, referred to as water) using the water-supply treatment system 101, the vent valve 90 of the condensing tank 81 is opened, and then the outflow valve 102 of the water-supply treatment system 101 is opened. Thereby, the condensing tank 81 is filled with water to a predetermined water level (S210). After the condensing tank 81 is filled with water, the vent valve 90 of the condensing tank 81 and the outflow valve 102 of the water-supply treatment system 101 are closed.

In order to fill the accumulator 21 with the water of the condensing tank 81 at a predetermined amount, the vent valve 90 of the condensing tank 81 is opened, and the inflow and outflow valves 112 and 115 of the water-supply pump are opened. In order to smoothly exhaust air when the accumulator 21 is filled with water, the pressure control valves 42 and 43 for the test vessel and their upstream shut-off valves 51 and 52, and the drain valve 68 for the test vessel and its upstream shut-off valve 67, and the shut-off valve 85 for the condensate water collecting pipe are all opened. After the water-supply pump 111 is operated to fill the accumulator 21 with the water of the condensing tank 81 to a predetermined water level, the drain valve 68 for the test vessel and its upstream shut-off valve 67 are closed (S220). It is checked whether or not the water of the condensing tank 81 reaches a predetermined water level. If the condensing tank 81 is short of water, the condensing tank 81 is additionally filled with water using the water-supply treatment system 101 as described above.

In the case in which the loop seal 47 on the upstream side of the subject safety valve 48 is filled with water because the water discharge test needs to be performed on the safety valve loop seal, a temporary hose is connected between the water-supply treatment system 101 and the drain valve 57 for the loop seal. A drain valve 57-1 for continuously draining the water from the loop seal is closed, and a drain valve 44-1 for the test vessel is opened. Then, the drain valve 57 for the loop seal is opened. Thereby, the loop seal 47 is filled with water from the water-supply treatment system 101. When the water is drained to the drain valve 44-1 for the test vessel, the process of filling the loop seal 47 with water is completed. At this time, the drain valve 57 for the loop seal and the drain valve 44-1 for the test vessel are closed.

In the case in which the water discharge test is performed on the safety valve loop seal, the steam is accumulated and pressurized in the accumulator 21 and the test vessel 41 when the loop seal 47 is filled with water. As such, the subject safety valve 48 is tested using a pressurizing force of the water. In detail, the water of the loop seal 47 should be discharged to the discharge pipe 82 through the subject safety valve 48 for the subject safety valve 48 to be opened by the pressure of the steam.

When the water of the accumulator 21 is heated to produce steam by the electric heater 22, the steam is condensed into water in the test vessel pressurization pipe 35 connected to the upper portion of the accumulator 21 and the test vessel 41. Thus, in order to smoothly drain this condensate water, the condensate water drain valve 64 of the pressurization pipe 35, the drain valve 67 of the test vessel, and the shut-off valve 85 for the condensate water collecting pipe are opened.

In this manner, the electric heater 22 of the accumulator 21 heats the water to produce steam (S230). When steam is starting to be produced from the accumulator 21, the steam is introduced and accumulated in the upper portion of the accumulator 21 and the test vessel 41 connected with the accumulator. While the steam is accumulated, the temperatures and pressures of the accumulator 21 and test vessel 41 are increased, and can be checked by the temperature gauge 24 and 25 and the pressure gauge 26 installed on the accumulator 21 and by the temperature gauge 50 and the pressure gauge 49 installed on the test vessel 41.

The water of the accumulator 21 continues to be heated by using the electric heater, and thus the pressures of the accumulator 21 and the test vessel 41 are increased to predetermined pressures (e.g. 160 kg/cm$^2$ if the opening pressure of the subject safety valve is 175 kg/cm$^2$) (S240). In this process, the preheating valve 59 of the test vessel 41 is intermittently opened to allow the high-temperature steam of the accumulator 21 to be discharged through the test vessel 41 such that the accumulator 21 and the test vessel 41 are heated at the same time. At this time, in order to minimize the thermal stresses of the accumulator 21, the test vessel 41 and their pipes, the water is heated within a predetermined rate of temperature increase (or a predetermined heating rate). Further, if the water in the accumulator 21 is reduced below a predetermined water level during heating and pressurizing using the electric heater of the accumulator 21, the operation of the electric heater is stopped for a while, and then the accumulator 21 is filled with the water of the condensing tank 81 to a predetermined water level as described above.

There are two methods of gradually increasing the pressure of the test vessel 41 until the subject safety valve 48 is operated. Among them, one is adapted to heat and pressurize the accumulator 21 to the pressure higher than the operating pressure of the subject safety valve 48 aside from the test vessel 41, and then pressurize the test vessel 41 such that the subject safety valve 48 can be operated, and the other is adapted to cause the accumulator 21 and the test vessel 41 to communicate with each other, operate the electric heater of the accumulator 21 until the subject safety valve 48 is operated, and simultaneously increase the pressures of the accumulator 21 and the test vessel 41 at a predetermined pressurization rate. Herein, only the former method will be described in detail.

When the pressures of the accumulator 21 and the test vessel 41 reach a predetermined pressure (e.g. 160 kg/cm$^2$), the first pressure control valve 42 of the pressurization pipe and its upstream shut-off valve 51 are closed, and the second pressure control valve 43 is regulated so as to constantly control the pressure of the test vessel 41. Afterwards, the electric heater of the accumulator 21 continues to be operated such that the steam required for testing the subject safety valve 48 is accumulated to a predetermined pressure in the accumulator 21 (e.g. 185 kg/cm$^2$ if the opening pressure of the subject safety valve 48 is 175 kg/cm$^2$).

In the case in which the set pressure test is performed on the subject safety valve 48, the drain valve 57-1 of the loop seal 47 is opened such that the loop seal 47 is filled with the steam, and then the pressure of the test vessel 41 is gradually increased (e.g. at a pressurization rate of 2 psi/sec or less) using the second pressure control valve 43 until the subject safety valve 48 is operated. The pressure and its associated data are measured when the subject safety valve 48 is operated (S250). Then, when the subject safety valve 48 is closed, the test vessel 41 is kept under predetermined pressure using the second pressure control valve 43. In this state, the seat tightness test of the subject safety valve 48 is performed. The seat tightness of the subject safety valve 48 is checked by measuring the temperature of the outlet port of the subject safety valve or visually observing the outlet port of the subject safety valve.

In order to perform the water discharge test of the loop seal, the flow rate test, the blow-down test, etc. unlike the set pressure test of the subject safety valve 48, it is important to pressurize the subject safety valve 48 at a predetermined pressurization rate or to supply the steam to the subject safety valve 48 such that the subject safety valve 48 is kept open for a predetermined time. To this end, the test vessel 41 is kept under a predetermined pressure (e.g. 160 kg/cm$^2$ if the opening pressure of the subject safety valve is 175 kg/cm$^2$), and the accumulator 21 accumulates the steam to a predetermined pressure (e.g. 200 kg/cm$^2$) at which the steam required for testing the subject safety valve is collected. Afterwards, the first pressure control valve 42 is opened at a high speed or at a predetermined speed, thereby providing required pressurization rate or steam flow rate to the subject safety valve 48. Then, the associated data are measured when the subject safety valve 48 is operated.

When the testing of the subject safety valve 48 is completed, the operation of the electric heater of the accumulator 21 is stopped, and the testing apparatus is cooled down. At this time, the cooling is preferably natural cooling. Further, the cooling is carried out within a predetermined cooling rate range in order to minimize the thermal stress.

In the process of testing the subject safety valve 48 using the testing apparatus as described above, when any pipe or valve is damaged or leaks out, the operation of the electric heater of the accumulator is stopped and the pressures of the accumulator and test vessel are released in order to protect human life and the testing apparatus.

While the present invention has been shown and described in connection with the exemplary embodiments, it will be apparent to those skilled in the art that modifications and variations can be made without departing from the spirit and scope of the invention as defined by the appended claims. For example, the shape and structure of each component specified in the exemplary embodiments of the present invention in detail can be modified.

INDUSTRIAL APPLICABILITY

According to exemplary embodiments of the present invention, an apparatus and method for testing the performance of a safety valve perform tests under the same operation conditions as a pressurizer safety valve installed on a reactor coolant system of a nuclear power plant, so that the tests can be performed with precision, which is advantageous to the industrial application.

The invention claimed is:

1. An apparatus for testing the performance of a safety valve to perform a set pressure test, a seat tightness test, a flow rate test, a blow-down test, a water discharge test of a loop seal, and a discharge load test of the safety valve, the apparatus comprising:
   an accumulator including at least one electric heater for heating a predetermined amount of water in the accumulator, and storing steam produced by the electric heater under pressure;
   a test vessel storing the steam supplied from the accumulator, and providing test pressure to a safety valve being tested, the steam being supplied after flow rate and pressure of the steam are controlled;
   a condensing tank storing demineralized water to be supplied to the accumulator, and condensing and collecting the steam discharged from the safety valve; and
   a water-supply pump supplying the water stored in the condensing tank to the accumulator, wherein the condensing tank contains a sparger which sparges the steam discharged from the safety valve into the water.

2. The apparatus according to claim 1, wherein the sparger includes a plurality of holes distributed at predetermined intervals with a predetermined size such that the steam discharged from the safety valve is sparged.

3. The apparatus according to claim 1, wherein the accumulator is connected to a pipe, including a blind flange, disposed at a lower portion of the accumulator to inject or drain the water supplied by the water-supply pump, and, when the water in the accumulator is to be used for another component, the blind flange is used for connection of the pipe to the other component.

4. The apparatus according to claim 1, wherein the accumulator is connected to the condensing tank through a pipe to drain the water from the accumulator, and including a drain valve coupled to the pipe.

5. The apparatus according to claim 4, further comprising an orifice at a downstream side of the drain valve to reduce flow rate and pressure.

6. The apparatus according to claim 1, wherein the accumulator is connected to a pipe, including a blind flange, disposed at an upper portion of the accumulator for supplying the steam discharged from the accumulator to the test vessel, and, when the water in the accumulator is to be used for another component, the blind flange is used for connection to the other component.

7. The apparatus according to claim 1, wherein an upper portion of the accumulator is connected with a lower portion of the test vessel by a pipe on which a first pressure control valve is installed for supplying the steam from the accumulator to the test vessel at a predetermined flow rate and pressure.

8. The apparatus according to claim 7, including a second pressure control valve installed on a pipe that is parallel to the first pressure control valve, the second pressure control valve having a capacity smaller than that of the first pressure control valve for use when the test vessel is preheated, when the pressure of the test vessel is automatically kept constant, and when the safety valve is tested and the test vessel is pressurized at a predetermined pressurization rate.

9. The apparatus according to claim 7, further comprising a pipe having a steam trap for discharging condensate water to the condensing tank, the condensate water being produced from a pipe on an upstream side of the first pressure control valve.

10. The apparatus according to claim 7, further comprising:
  a pipe having a steam trap for discharging condensate water to the condensing tank, the condensate water being produced from the test vessel, and
  a pipe between the first pressure control valve and the test vessel.

11. The apparatus according to claim 10, further comprising a condensate water discharge valve for discharging the condensate water from a lower portion of the test vessel before operation of the safety valve is being tested.

12. The apparatus according to claim 11, further comprising an orifice provided on a downstream side of the condensate water discharge valve to reduce flow rate and pressure.

13. The apparatus according to claim 1, including a loop seal bent to be filled with the water for the water discharge test, and installed between the test vessel and the safety valve.

14. The apparatus according to claim 13, further comprising an electrical heat tracing system installed on the safety valve and a pipe on an upstream side of the safety valve for accurately simulating and measuring behavior of the water discharged from the loop seal by operation of the safety valve.

15. The apparatus according to claim 1, further comprising a preheating valve installed on a preheating pipe such that the steam is discharged from the test vessel to the condensing tank to preheat the test vessel.

16. The apparatus according to claim 15, further comprising an orifice provided on a downstream side of the preheating valve to reduce flow rate and pressure.

17. The apparatus according to claim 1, wherein the condensing tank includes rupture disks that prevent overpressure resulting from inflow of the steam under high temperature and pressure and discharge fluid when the safety valve is operated.

18. A method for testing the performance of a safety valve by performing a set pressure test, a seat tightness test, a flow rate test, a blow-down test, a water discharge test of a loop seal, and a discharge load test of the safety valve, the method comprising:
  1) filling a condensing tank with a predetermined amount of water, the condensing tank storing demineralized water to be supplied to an accumulator and condensing and collecting steam discharged from the safety valve being tested;
  2) filling the accumulator with the water of the condensing tank to a predetermined water level using a water-supply pump;
  3) heating the water in the accumulator using at least one electric heater to produce the steam;
  4) supplying the steam produced from the accumulator to a test vessel with controlled flow rate and pressure, and pressurizing the accumulator and the test vessel to a preset pressure; and
  5) continuously operating the electric heater of the accumulator to increase the pressure to the operating pressure of the safety valve, and thereby testing the subject safety valve, wherein 4) includes closing a first pressure control valve between the accumulator and the test vessel and a shut-off valve of an upstream side of the first pressure control valve when the accumulator and the test vessel reach a predetermined pressure, and constantly controlling the pressure of the test vessel through a second pressure control valve installed parallel to the first pressure control valve and having a capacity smaller than that of the first pressure control valve.

19. The method according to claim 18, wherein 5) includes continuously operating the electric heater of the accumulator to accumulate the steam in the accumulator to a predetermined pressure required for testing the safety valve, gradually increasing the pressure of the test vessel using the second pressure control valve until the safety valve is operated, and thereby testing the safety valve.

20. The method according to claim 18, wherein 5) includes accumulating the steam in the accumulator to a predetermined pressure required for testing the safety valve, opening the first pressure control valve to provide a required pressurization rate or steam flow rate to the safety valve, and testing the safety valve.

21. The method according to claim 18, wherein 4) includes intermittently opening a preheating valve connected to the test vessel to cause the steam in the accumulator to be discharged through the test vessel.

* * * * *